United States Patent
Loughborough et al.

(10) Patent No.: US 6,491,075 B1
(45) Date of Patent: Dec. 10, 2002

(54) WHEELS

(76) Inventors: Mark Loughborough, 1 Bennetts Lane, Bath BA1 5JX (GB); Saul Manashe, Gamele Kirkevei 108, 1617 Fredrikstadt (NO)

(*) Notice: Subject to any disclaimer, the term of this patent is extended or adjusted under 35 U.S.C. 154(b) by 0 days.

(21) Appl. No.: 09/889,393
(22) PCT Filed: Jan. 18, 2000
(86) PCT No.: PCT/GB00/00106
§ 371 (c)(1), (2), (4) Date: Jul. 17, 2001
(87) PCT Pub. No.: WO00/41900
PCT Pub. Date: Jul. 20, 2000

(30) Foreign Application Priority Data

Jan. 18, 1999 (GB) .............................. 9901020

(51) Int. Cl.[7] .................................................. B60B 9/12
(52) U.S. Cl. .......................................... 152/48; 152/40
(58) Field of Search .................. 152/7, 40, 44, 152/48, 1, 17, 20, 47

(56) References Cited

U.S. PATENT DOCUMENTS

| | | | | |
|---|---|---|---|---|
| 1,098,577 A | * | 6/1914 | Johnstone | |
| 1,267,230 A | * | 5/1918 | Keim | |
| 1,396,984 A | * | 11/1921 | Willis | |
| 1,444,048 A | * | 2/1923 | Walther | |
| 1,447,365 A | * | 3/1923 | Walther | |
| 1,494,592 A | * | 5/1924 | Deister | |
| 1,499,809 A | * | 7/1924 | Duke | |
| 5,265,659 A | * | 11/1993 | Pajtas et al. | |
| 5,653,510 A | | 8/1997 | Osborne | ................. 301/95.101 |
| 6,123,128 A | * | 9/2000 | Ringenbach | |

FOREIGN PATENT DOCUMENTS

| | | |
|---|---|---|
| DE | 44 16 796 | 11/1995 |
| FR | 2 774 032 | 7/1999 |
| GB | 240368 | 10/1925 |
| GB | 626282 | 7/1949 |
| WO | WO 96/11119 | 4/1996 |
| WO | WO 97/45276 | 12/1997 |
| WO | WO 97/18098 | 5/1998 |
| WO | WO 98/33666 | 8/1998 |

* cited by examiner

Primary Examiner—Russell D. Stormer
(74) Attorney, Agent, or Firm—Blank Rome LLP

(57) ABSTRACT

The wheel comprises an inner rim attached to a wheel hub e.g. by spokes, an outer rim for receiving a tire, and a resilient member between the rims which in use serves to absorb shocks from the surface over which the wheel passes. An opening for a valve is provided. The material of the member is polymeric, e.g. polyurethane foam.

6 Claims, 2 Drawing Sheets

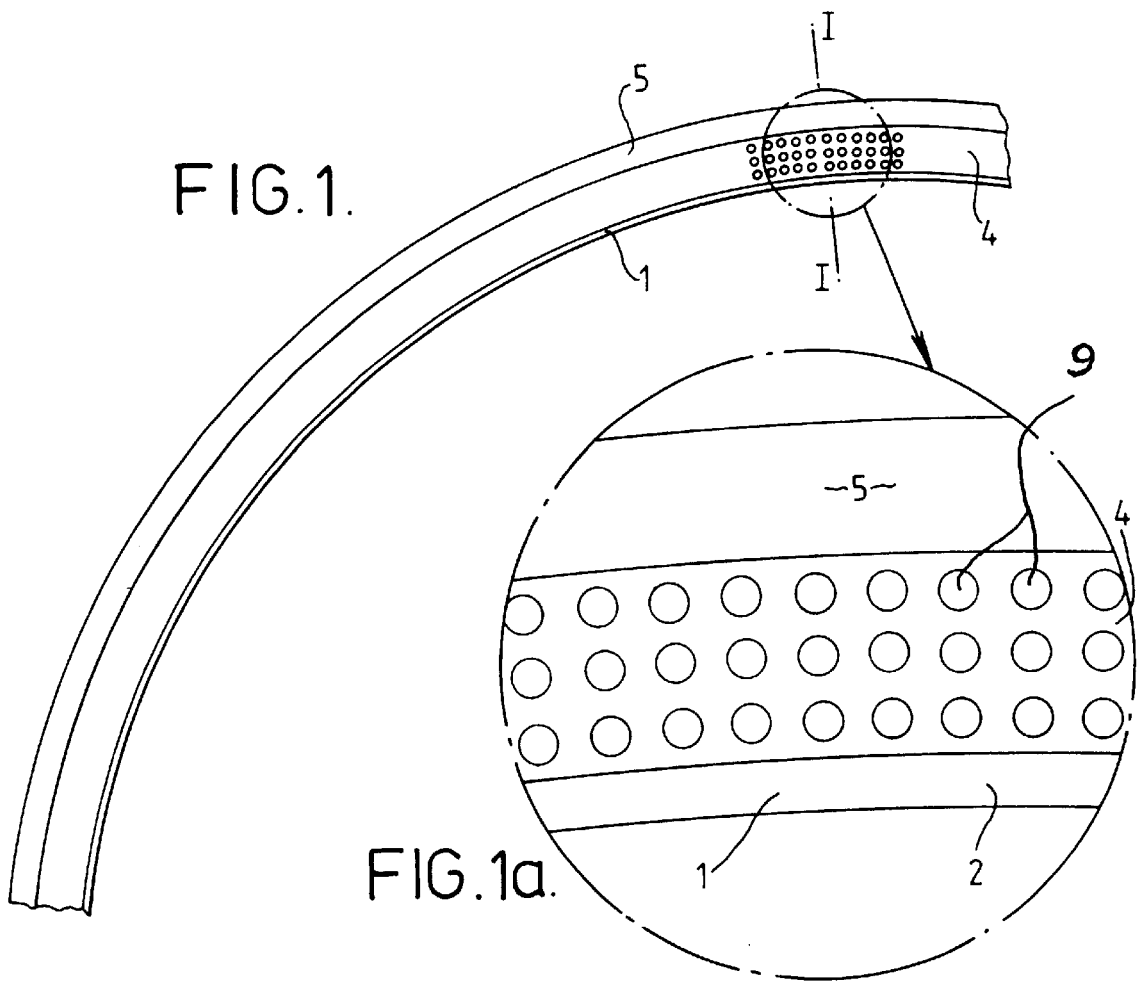
FIG. 1.
FIG. 1a.
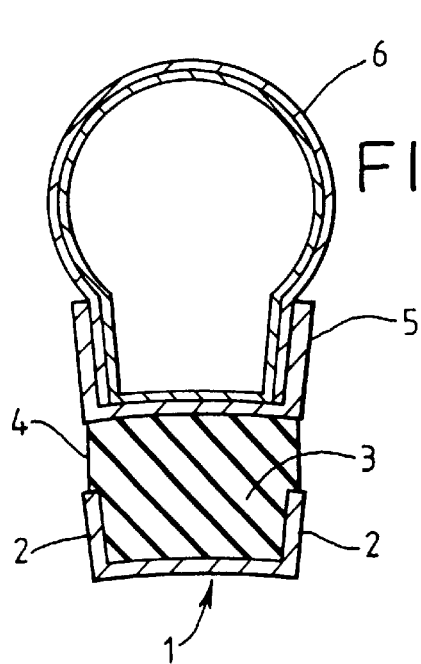
FIG. 2
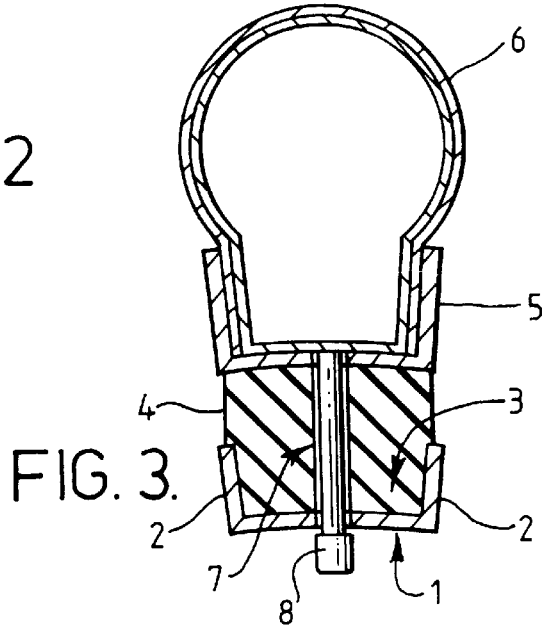
FIG. 3.

WHEELS

This invention concerns wheels for example, but not exclusively, for wheelchairs and other means of conveyance, for example bicycles.

Cycle and wheelchair wheels were originally made with solid rubber tires. Subsequently the solid rubber tire was replaced by tires with pneumatically inflatable inner tubes, these having the advantage that they act as shock absorbers when travelling over uneven surfaces.

The change to pneumatic tires dramatically improved the comfort, road holding and safety of vehicles which used them, especially at the higher speeds which could be obtained with their use.

More recent developments have led to cycles of more sophisticated design which include separate shock absorbers to absorb greater shocks than can be absorbed by pneumatic tires alone, for example spring suspensions of the forks for the front and/or rear wheels.

Despite improvements in the suspension of cycles, apart from the use of pneumatic tires, wheelchairs have generally relied on no more than the use of rubber bushings for mounting the axles to provide shock absorption. Such suspension systems serve to reduce the unsprung weight of the wheelchair to more nearly that of the wheel which is supported by the tires and so improve their ride.

The introduction of battery powered assistance for cycles, wheelchairs and other types of conveyance which include motors in the wheels has resulted in an increase in wheel weight which demands increased shock absorbing performance from the tires due to the increased weight leading to increased rolling resistance for the tires and decreased lateral stability. However, the suspension systems referred to above do not in general improve the situation because the wheels themselves are unsprung.

According to the present invention there is provided a wheel for a bicycle, wheelchair or the like comprising an inner rim attached to a wheel hub, an outer rim for receiving a tires, and a resilient member between the inner and outer rims which in use serves to absorb shocks from the surface over which the wheel passes.

The invention also provides bicycles and wheelchairs including at least one wheel in accordance with the present invention.

Embodiments of wheel in accordance with the present invention will now be described by way of example with reference to the accompanying diagrammatic drawings in which:

FIG. 1 shows a side view of a portion of a first embodiment of wheel; FIG. 1a shows the circled portion of FIG. 1 to an enlarged scale;

FIG. 2 is a section on line I—I of FIG. 1 with a tire and inner tube;

FIG. 3 is a section similar to that of FIG. 2 through a valve for the inner tube;

Figure 4:
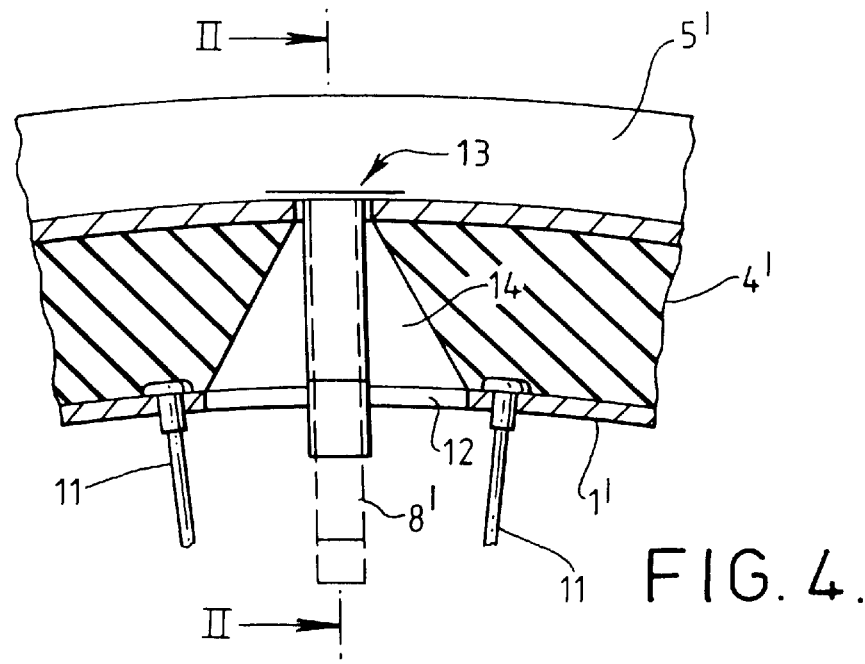
FIG. 4 shows a side view of a portion of a second embodiment of wheel.

The wheel shown in FIGS. 1 to 3 has an inner rim 1 connected to a conventional hub (not shown), for example by spokes (not shown), and an outer rim 5 which is substantially similar to the rim of a wheel of a conventional bicycle or wheelchair. An inflatable tire 6 is shown located in the rim 5. Between the inner rim 1 and the outer rim 5 is located a resilient radial spacing element 4 which bonds the inner and outer rims together. If desired, the outer rim 5 can be provided with radially inwardly extending projections for improving the bonding of the radial spacing element 4 thereto.

The wheel shown in FIG. 3 includes a radial bore 7 through the outer rim 5, the radial spacing element 4 and the inner rim 1 through which the valve 8 of the inflatable inner tube for the tire 6 is passed. This facilitates both inflation of the inner tube and its removal, for example to repair a puncture or to replace the inner tube. The wheel in FIGS. 4 to 6, which is shown without a tire, is substantially similar to that of FIGS. 1 to 3.

This wheel has an inner rim 1' connected to a conventional hub (not shown) by spokes 11 and to an outer rim 5' which is substantially similar to the rim of a wheel of a conventional bicycle or wheelchair. An inflatable tire (not shown) is located in the rim 5'. Between the inner rim 1' and the outer rim 5' is located a resilient radial spacing element 4' which bonds the inner and outer rims 1' and 5' together.

Figure 5:
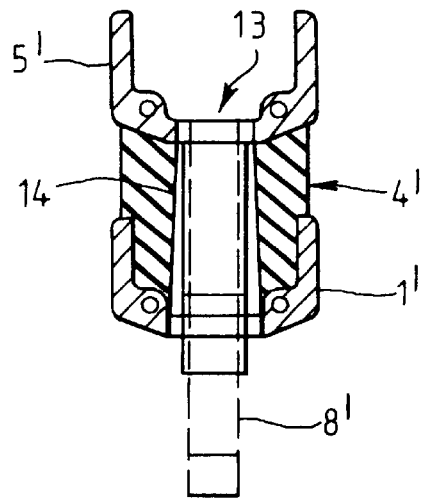
FIG. 5 is a cross-section along line II—II of FIG. 2.

Bonding of the outer rim 5' to the spacing element 4' can be improved, for example, by providing the outer rim 5' with radially inwardly extending projections, by providing the radially inner surface of the outer rim 5' with a profile such as is shown in FIG. 5 which serves to reduce the risk of the outer rim 5', parting from the spacing element 4', and/or by roughening the radially inner surface of the outer rim 5'.

Figure 6:
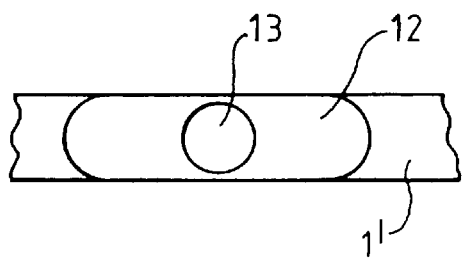
FIG. 6 is a view of the embodiment of FIG. 4 from above.

The wheel shown in FIGS. 4 to 6 has a slightly different arrangement for locating the valve 8' of an inner tube (not shown) from that shown in FIGS. 1 to 3. Whilst the outer rim 5' has a circular hole 13 through which the valve 8' can be passed in conventional manner, the inner rim 1' of this embodiment has a circumferentially extending slot 12 instead of the circular hole shown for the embodiment of FIGS. 1 to 3. In addition, the spacing element 4' has a substantially wedge-shaped slot 14 in it which extends from the slot 12 in the inner rim 1' to the hole 13 in the outer rim 5'. This arrangement enables the valve 8' to move circumferentially relative to the inner rim 1' such as occurs when accelerating or braking forces are applied to the inner rim 1' relative to the outer rim 5'.

The resilient radial spacing elements 4 and 4' can be constructed with cross sections and from materials appropriate to the particular application to which the wheels are to be put.

The spacing elements 4 and 4' are preferably made of a polyurethane foam, but other resilient polymeric materials can be used for the purpose provided they provide a suitable shock absorbing effect. As will be appreciated, different degrees of resilience may be required for the front and rear wheels of a bicycle, and different still for the drive wheels of a wheelchair. Thus different resilient materials can be used for wheels used in different conveyances and in different positions within the same conveyance. In addition, or as an alternative, to using different polymeric materials to achieve different degrees of resilience, the materials themselves can be provided with a more or less open structure. For example they can be made of a foamed polymeric material or they can have air spaces formed in them during manufacture, FIG. 1a showing holes 9 of substantially cylindrical cross section.

The elastomer used for the elements 4 and 4' should in general have a dynamic hysteresis response to forces applied thereto and so provide damping rather than mere resilience as with a conventional metal spring. This property tends to be exhibited by polyurethane elastomers.

If desired, the radial spacing elements 4 and 4' can be constructed with elements that reinforce lateral resistance to the plane of the wheel, such force being encountered when a wheelchair is moving across an inclined surface.

The radial spacing elements 4 and 4' are preferably shaped or constructed to provide substantially similar shock absorbing performance around the area of the valves 8 and 8' as in other parts of the circumference of the wheel, for example by the inclusion of suitable reinforcing elements.

The stiffness of the wheel and tire combination is affected by the flexibility of the outer rims 5 and 5', and the compressibility of the radial spacing elements 4 and 4'. In addition, the air pressure in the inner tube (not shown) can have a considerable effect on the overall stiffness of the wheel.

The degree of torsional "unstiffness" of the outer rims 5 and 5' will also influence the overall shock absorbing performance of the wheels. It has been found as a result that gear changing under load, for example with bicycles, is facilitated.

It has been found that the braking performance of conveyances including wheels of the present invention can be improved compared with that of conveyances using conventional wheels, especially on rough surfaces; the braking force can be applied to either the inner or outer rims.

The "unstiffness" of wheels of the present invention resulting from the use of a flexible outer rim has not been found to significantly increase their rolling resistance since the performance of the resilient radial element in acting as a shock absorber is substantially determined at manufacture through the formulation and density of the material which is used. As a result, significant deformation of the outer rim and the resilient element can be arranged to occur substantially only when shock loads are applied to the [tire, for example when travelling under load over a rough surface.

If desired, devices can be inserted between the inner and outer rims to limit relative movement therebetween, for example one or more resilient polymeric plugs connecting them together and operating in slots in the radial spacing element 4' similar to that for the valve 8' could be used. When one such plug is used it is preferably located at the opposite end of the diameter including the valve 8'.

What is claimed is:

1. A wheel for a bicycle, wheelchair or the like comprising an inner rim attached to a wheel hub, a flexible outer rim of substantially "U" shaped cross section for receiving a tire, and a resilient member bonded to the inner rim and to the outer rim which in use serves to absorb shocks from the surface over which the wheel passes, the flexible outer rim and the resilient member providing the wheel with unstiffness such that with a tire mounted on the outer rim significant deformation of both the outer rim and the resilient elements occurs substantially only when shock loads are applied to the tire.

2. A wheel according to claim 1, wherein the resilient member comprises a polyurethane.

3. A wheel according to claim 2, wherein the polyurethane is in the form of a foam.

4. A wheel according to claim 1, wherein the outer rim is flexible.

5. A bicycle including at least one wheel according to claim 1.

6. A wheelchair including at least one wheel according to claim 1.

* * * * *